(12) United States Patent
Vadhri

(10) Patent No.: US 8,001,025 B2
(45) Date of Patent: Aug. 16, 2011

(54) SYSTEMS AND METHODS FOR FACILITATING FINANCIAL TRANSACTIONS OVER A NETWORK

(75) Inventor: Srinivas Vadhri, Cupertino, CA (US)

(73) Assignee: eBay, Inc., San Jose, CA (US)

( * ) Notice: Subject to any disclaimer, the term of this patent is extended or adjusted under 35 U.S.C. 154(b) by 58 days.

(21) Appl. No.: 12/147,820

(22) Filed: Jun. 27, 2008

(65) Prior Publication Data

US 2009/0327010 A1 Dec. 31, 2009

(51) Int. Cl.
*G06Q 40/00* (2006.01)
(52) U.S. Cl. .............. 705/35; 705/44; 705/40; 705/39; 705/42
(58) Field of Classification Search ............ 705/44, 705/39, 40, 42, 35, 62, 1, 412, 65, 14.1, 14.23, 705/14.15
See application file for complete search history.

(56) References Cited

U.S. PATENT DOCUMENTS

| | | | |
|---|---|---|---|
| 2001/0037311 A1* | 11/2001 | McCoy et al. | 705/65 |
| 2003/0126075 A1* | 7/2003 | Mascavage et al. | 705/39 |
| 2008/0162350 A1* | 7/2008 | Allen-Rouman et al. | 705/44 |
| 2008/0262919 A1* | 10/2008 | Ang et al. | 705/14 |

OTHER PUBLICATIONS

Ophthalmic imaging systems, Edgar Online, Nov. 15, 2006.*
Person to person loans finally come to Canada with the first online lending marketplace: IOU Central, Feb. 12, 2008, Canada Newswire.*
Will planning and the family home, Dec. 1, 2005, Financial Times Business Limited, Money Management.*
Staff, Buying co-ops could become an IOU trend, some say, but others point to tough politics, Monday Jun. 7, 2004, Electric Utility Week.*

* cited by examiner

*Primary Examiner* — Behrang Badii
(74) *Attorney, Agent, or Firm* — Haynes and Boone, LLP

(57) ABSTRACT

A system for facilitating financial transactions over a network includes a first user device, a second user device and a payment processing device. The first user device is adapted to allow a first user to send an invitation to a second user, via a network, to accept a promise to pay (IOU). The second user device is adapted to allow the second user to generate a response to the invitation via the network. The payment processing device is adapted to receive the invitation and the response and to schedule a payment if the response is an affirmative response.

12 Claims, 4 Drawing Sheets

SYSTEMS AND METHODS FOR FACILITATING FINANCIAL TRANSACTIONS OVER A NETWORK

BACKGROUND

1. Field of the Invention

The present invention generally relates to financial transactions and more particularly to facilitating financial transactions over a network.

2. Related Art

In online financial transactions, customers may use third-party payment service providers to pay for products and services through electronic communications with online merchants over electronic networks, such as the Internet. The third-party payment providers provide an infra-structure, software and services that enable member customers and member merchants to make and receive payments. The payments may be credit card payments, electronic bank transfers or other payment techniques offered by the third-party payment provider. One payment technique may be transferring money from an account held by the payment provider, as opposed to transferring credit from an outside credit card company or an outside financial institution or bank. Transferring money held in the payment provider account may be cheaper for a user because it avoids certain transaction fees or interest payments that may be incurred when transferring money or making a payment from an outside credit or banking institution.

Typically, transactions are between a member consumer and a member merchant. However, member consumers may also transfer money to other consumers, and some consumers may operate small-businesses, for example selling or reselling things on an on-line auction system. Users with payment provider accounts may or may not have a sufficient balance to make certain transactions at a particular time. In that situation, if the only accepted funding source is a money or bank account, then the user may not be able to bid and acquire the desired item. This may also hurt the seller, as the seller may be missing out on a potential sale or another bidder to drive up the selling price of the item.

SUMMARY

In an exemplary embodiment, a system for facilitating financial transactions over a network includes a first user device, a second user device and a payment processing device. The first user device is adapted to allow a first user to send an invitation to a second user, via a network, to accept a promise to pay (IOU). The second user device is adapted to allow the second user to generate a response to the invitation via the network. The payment processing device is adapted to receive the invitation and the response and to schedule a payment if the response is an affirmative response.

These and other features and advantages of the present invention will be more readily apparent from the detailed description of the embodiments set forth below taken in conjunction with the accompanying drawings.

Figure 1:
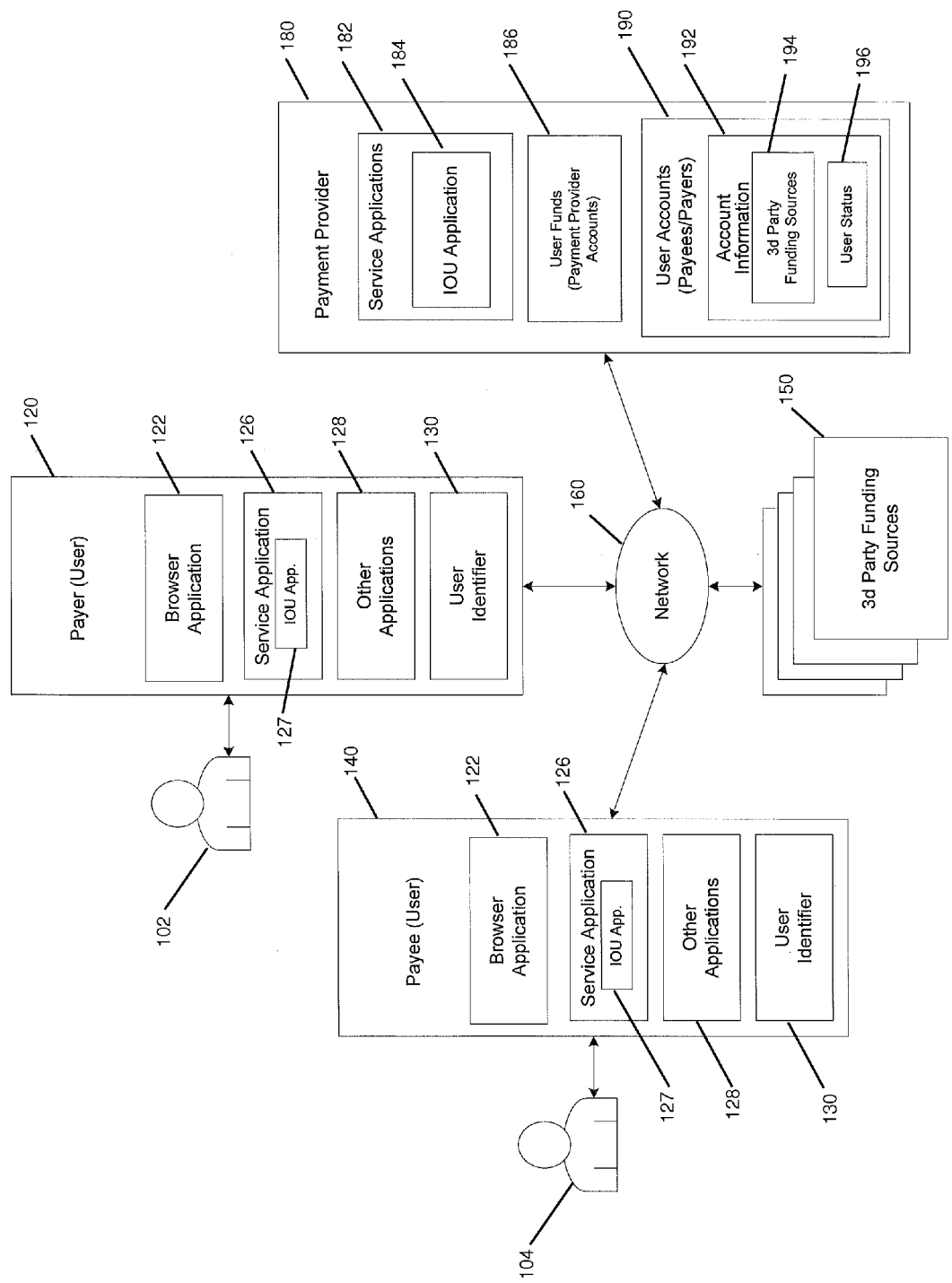
FIG. 1 illustrates a block diagram of an exemplary embodiment of a networked system configured to facilitate online.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure enable users to offer an IOU and accept an IOU, using a payment provider service, for example via an application or through a web browser over a network, for example the Internet.

In an exemplary embodiment, a user (payer) may access a payment provider system to generate a simple record of a promise to pay ("IOU") another user (payee) a certain amount of money at some future date or time. An invitation to accept an IOU may be sent as a transaction over a payment system, for example over a network (e.g. Internet) from a Payer to a receiver/Payee. A payer, for example might not have cash on him and may not have the money in an online account, for example an account held by the payment provider. Such a payer may wish to send an IOU message to another payment system user, to let them know that they will send or transfer the money to their account by a future date. If the Payee user agrees, a record of the promise may be kept in the payment system. When the pre-agreed date and time arrives, the money may be automatically deducted from a Payer's account and transferred to a Payee's account to complete the transaction and satisfy the promised payment. In an alternate embodiment, the system may transfer funds as soon as sufficient funds are present in the Payer's account, even if the promised date of payment has not yet arrived.

The IOU feature may facilitate transactions among users that might not otherwise be made. Since users are pre-screened and verified as having secondary payment sources in case that the user's payment system account does not sufficient funds to transfer the funds as promised, a payee may have more confidence to accept a promise to pay, as opposed to receiving nothing, avoiding the transaction, or accepting a promise that may seem more risky, because of the unknown nature of the payer's access to funds. The IOU feature may also enable a user who expects sufficient funds to be transferred into his account, for example in payment for something sold on an online auction service or otherwise transferred into his account, to promise to pay in the future, without having to schedule a payment by a bank or other credit institution. Involving a third-party financial institution may incur additional transaction costs or fees, and a user can avoid those by conducting the transaction from funds in their more-easily accessed user account with the payment system. Although the payment system may have some fee for the transaction, it can be less than the total fees charged by the payment system and a third-party institution to schedule or make a payment from the third-party source.

Nevertheless, the availability of the third-party sources in the event that funds are not transferred into the user's payment provider account makes the promise more trustworthy and facilitates transactions. Also, since private users may use the IOU function to pay each other, non-merchant accounts may be able to promises to pay more reliably than they might without the benefit of the payment provider vetting, rating and verifying another user's trustworthiness or availability of third-party funds to back up a promise.

The system may provide a means for users to agree to accept less than full payment if paid by an earlier date than the agreed upon pay-by date. Such an agreement may be made during the initial creation of the promise to pay or by modification of the agreement at a later date. In any case, a payer may agree to accept a lower payment if paid by an agreed-upon earlier payment date.

FIG. 1 shows one embodiment of a block diagram of a system 100 configured to facilitate financial transactions over a network 160. As shown in FIG. 1, system 100 includes at least one payer device 120, one payee device 140, and at least one payment provider server 180 in communication over the network 160.

In one embodiment, the network 160 may be implemented as a single network or a combination of multiple networks. For example, in various embodiments, the network 160 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

In one embodiment, the payer device 120 may be implemented using any appropriate combination of hardware and/or software configured for wired and/or wireless communication over the network 160. For example, the payer device 120 may be implemented as a personal computer of a payer/user 102 in communication with the network 160, such as the Internet. In other examples, the payer device 120 may be implemented as a wireless telephone (e.g., cell phone), personal digital assistant (PDA), notebook computer, and/or various other generally known types of computing devices.

In one embodiment, the payer device 120 may include one or more browser applications 122 which may be used, for example, to provide a user interface to permit the user or payer 102 to browse information available over the network 160. For example, the browser application 122 may be implemented as a web browser to view information available over the Internet.

In an example embodiment, the payer device 120 may include a service application 126 for facilitating financial transactions on the network 160. The service application may include an application 128 which may support or facilitate a promise-to-pay transaction or IOU transaction. In an example embodiment, the service application 126 comprises a software program or programs, such as a graphical user interface (GUI), executable by a processor that is configured to interface and communicate with other users 104 (for example payees) via the network 160 and a payee device 140 and with the payment provider server 180 via the network 160. In an example embodiment, the service application may be resident on the payer device or accessed by a user through a network, for example on an Internet browser with access to the Internet. The user/payer 102 may initiate an IOU transaction with a second user/payee 104. The second user may respond to the first user and the payment provider server 180 may facilitate the transaction, record the transaction and execute the transaction as appropriate.

In an example embodiment, the service application 126 and IOU application 128 may be accessed using a protocol such as a WSDL (web services definitional language), SOAP (simple object access protocol), API (application program interface) or the like. The applications may be initiated from a remote call procedure from an API or other protocol. The remote calls may be initiated from a program resident on the user's device, for example a financial software program such as QUICKEN, QUICKBOOKS, INTUIT, SAP or from a third-party platform or website, for example a social networking site such as FACEBOOK, MYSPACE or any other website that may feature access to a payment provider service application or IOU application When installed on or accessed by the payer device 120 and run from the payer device 120, the service application 126 is configured to provide and display payment services mechanism or mechanisms, such as an image, icon, radio button, dialogue box or other graphical user interface (GUI) on a display component (e.g., monitor) of the payer device 120. In general, the GUI represents a program, application, command, link to a web page, etc., wherein the user 102 may select a payment service, shop, conduct other payment processing services. The GUI may include a the option of initiating an IOU transaction by taking a certain action, for example by clicking on a related icon, radio button, link or other button or representation using a cursor control component (e.g., mouse) or keyboard.

In an example embodiment, in which the user 102 has not yet established an account or user record with the payment provider server 180, upon installation of the service application 126, the user 102 may be prompted to establish a user account with the payment provider server 180, wherein the user 102 may use the payer device 120 to access the payment provider server 180 via the network 160. When establishing a user account, the user 102 may be asked to provide personal information, such as name, address, phone number, etc., and financial information, such as banking information, credit card information, etc. In exemplary embodiments, establishing the user account may include providing information related to third-party secondary funding sources 150, for example bank accounts or credit card accounts or lines of credit. The payment provider server 180 may communicate with the third-party funding sources 150 via the network to verify the existence of funds and/or credit.

The payment provider server 180 may create a user account 190 for each user 102 or payer. The user account may include account information 192, including third party funding source information 194 and a user status 196. The third-party funding source information 194 may include the identity of sources, routing numbers, account numbers and the like. Information related to the availability of funds and/or credit may be stored as part of a user status, and may represent a trustworthiness of the user when evaluated by a second user or payee 104 for the purposes of accepting or declining an invitation to enter into a promise-to-pay transaction with the user.

In an example embodiment, the payer device 120 may include other applications 128 as may be desired in particular embodiments to provide additional features available to the user 102. For example, such other applications 128 may include security applications for implementing payer-side security features, programmatic user applications for interfacing with an appropriate protocol such as WSDL, SOAP or API or the like over the network 160 or various other types of generally known programs and/or applications.

In an example embodiment, the payer device 120 may include one or more user identifiers 130, which may be implemented, for example, as operating system registry entries, cookies associated with the browser application 122, identifiers associated with hardware of the payer device 120, or various other appropriate identifiers. The user identifier 130 may include attributes related to the user, such as personal information (e.g., a user name, password, photograph image, biometric ID, address, phone number, etc.) and banking information (e.g., banking institution, credit card issuer, user account numbers, security information, etc.). In various implementations, the user identifier 130 may be passed with a promise-to-pay request to the payment provider server 180, and the user identifier 130 may be used by the payment provider server 180 to associate the user 102 with a particular user account 190 maintained by the payment provider server 180, in a manner as described herein.

In an example embodiment, the payee device 140 may be similar to a payer device 122. It may be owned, operated and maintained, for example, by a private user with a user account 190 stored on the payment provider 180. The user device 140, the browser application 142, service application 126, IOU application 127, other applications 128 and user identifier 130 may implemented similarly as described above with respect to the payer device.

In one embodiment, the payment provider server 180 may be maintained, for example, by an online payment service provider, which may provide payment processing for online transactions on behalf of the payer 102 to a second user (payee) of the payee device 140. In this regard, the payment provider server 180 includes one or more service applications 182, which may be configured to interact with the user devices 120, 140 over the network 160 to facilitate the financial transactions, purchase of items, products and/or services from other users or from third-party merchants (not shown). In an example embodiment, the service applications 182 may include an IOU application 184. In one example, the payment provider server 180 may be provided by PayPal, Inc. of San Jose, Calif., USA.

In an example embodiment, the payment provider server 180 may be configured to maintain a plurality of payer and payee accounts 190, each of which may include account information 192 associated with individual users, including the users 102 and 104 associated with the devices 120, 140. For example, account information 192 may include private financial information of payer 102 and payees 104, such as one or more account numbers, passwords, credit card information, banking information, or other types of financial information, which may be used to facilitate online transactions between the payer 102 of the payer device 120 and a payee 104 associated with the payee device 140.

In an example embodiment, the account information 184 may include information regarding user funds accounts 186, as well as at least one third-party funding source account 188 per user (payers and payees). The payment provider accounts 186 may represent funds that are held by the payment provider that maintains the payment provider server for use in payment services provided by the provider. The funds in the account may represent funds received in previous transactions and/or funds placed in the account by a user for access through the payment provider services and/or funds returned to a user by a merchant upon a return of an item or cancellation of a service. The third-party funding sources 194 may relate to outside institutions, for example banks, savings and loans, credit institutions.

In an example embodiment, a typical payment service transaction may permit a user/buyer to select a funds source for immediate payment for purchased goods or services. A user might elect to pay from an associated bank account, an associated credit card or directly from the user funds account 186. Typical payment service transactions may involve conducting a formal transaction with a merchant who demands immediate payment. Such transactions may involve certain transaction costs, interest payments or other costs of conducting a transaction.

If a user wants to exchange money with another user, those users may incur costs associated with bank or credit transactions if they were to exchange money from third-party funds sources. A user may want to conduct a transaction at a time when they don't have funds present in their user funds account. The third-party funds sources may be accessed to pay on a promise to pay if there are insufficient funds in a payment provider account on the date and time at which a payment in satisfaction of a promise to pay is to be made.

In various embodiments, the methods and systems described herein may be modified to accommodate users and/or merchants that may or may not be associated with at least one existing user account and/or merchant account, respectively.

Figure 2:
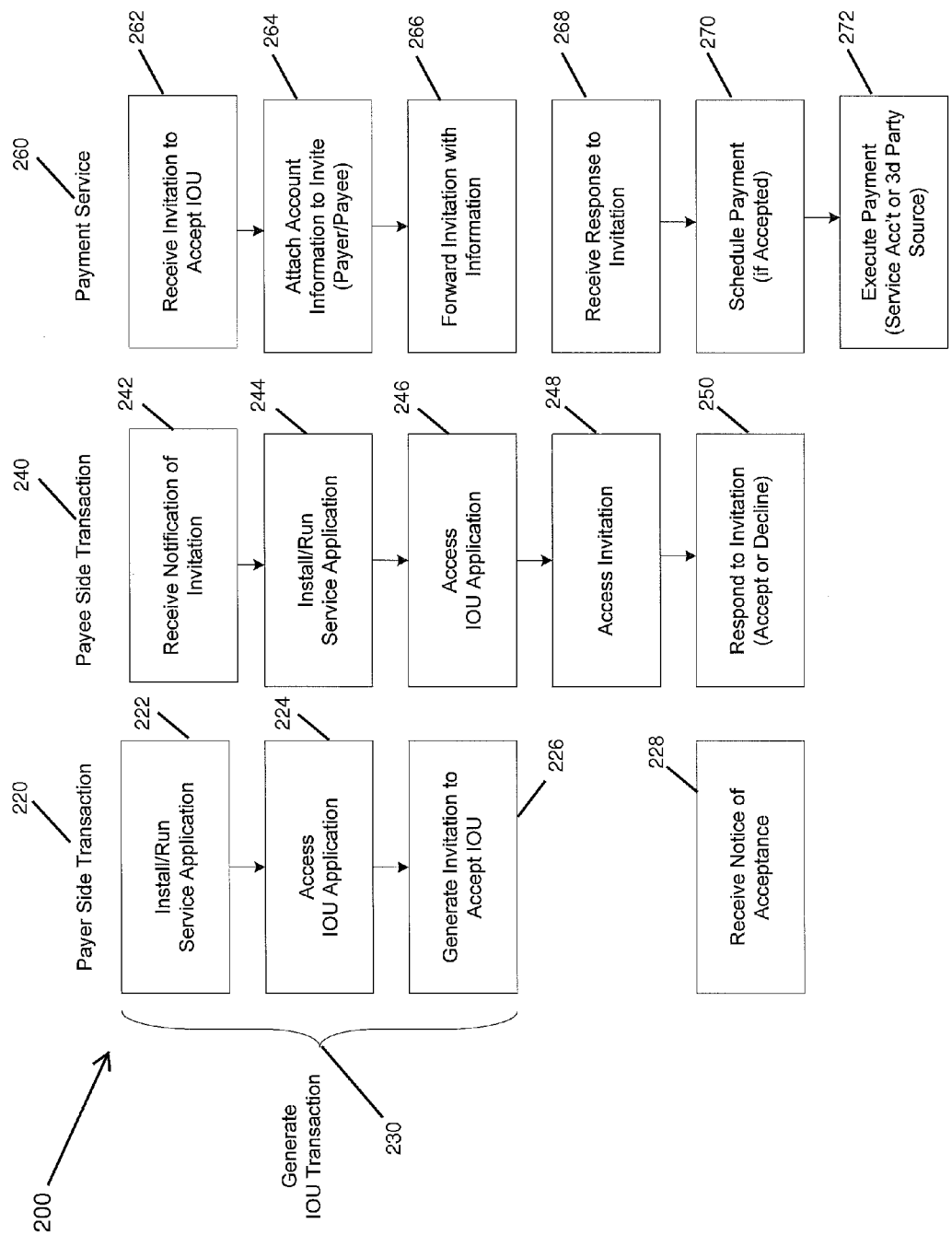
FIG. 2 illustrates a block diagram of an exemplary embodiment of a method for making a promise-to-pay transaction (IOU) over a network.

FIG. 2 illustrates an example embodiment of an IOU transaction method 200. In an example embodiment, the method may include a payer-side transaction 220, the payee-side transaction 240 and the payment service-side transaction 260. They payer-side transaction 220 may include generating the transaction 230, the payee side may include responding to the invitation 250 and the payment service transaction may include scheduling payment 270 when the promise to pay has been accepted.

In an example embodiment, a payer may generate the IOU transaction 220 by first installing/running/accessing the service application 222 on the payer device 120. The user 102 may then access the IOU application 224 from the payer device and send an invitation 226 to accept an IOU to another user. The invitation may be sent via a network to a payee device 140. The invitation may be sent as an e-mail, SMS, text message, instant message or any other appropriate electronic form of communication as desired. The invitation may generate an alert to notify the payee or may be accessed or read by a payee when the payee runs the service application on the payer device. The invitation may include a link to the service application embedded in an e-mail, SMS, text message, instant message or other form.

In an example embodiment, payer may be a new user accessing or installing the service application for a first time, or reopening a dormant account. Upon installation or opening of the service program, the user 102 may be prompted to establish a user account with the payment provider server 180, wherein the payer/user 102 may use the payer device 120 to access the payment provider server 180 via the network 160. When establishing a user account, the user 102 may be asked to provide personal information, such as name, address, phone number, etc., and financial information, such as banking information, credit card information, etc. In one embodiment, information related to the user 102 may be packaged as the user identifier 130 and stored on the payer device 120 and may be stored in account information 192 on the payment provider server 180 (FIG. 1).

In an example embodiment, the payer initiates the invitation via a GUI displayed on the payer device. In an example embodiment, the invitation may be initiated by selecting a radio button, clicking a link, entry in a dialog box or boxes, or any other graphic or visually represented selection on a screen or monitor of an electronic device, for example by touchscreen, full keyboard, number pad or telephone keyboard as appropriate for the particular type of device being used.

When enabled, the IOU application may transmit the invitation 226 along with user identifier 130 (FIG. 1) and other transaction information. The invitation may be sent 226 directly to a payee or first to the payment provider server, depending on the particular implementation. Sending the invitation directly to the payee device, while bypassing the payment provider server, may free up assets at the payment provider server pending agreement of the parties to the transaction, thereby sparing the payment provider from handling potential IOU transactions that may not be finally agreed-upon. Sending the invitation directly to the payment provider may provide an extra level of security for a payee, who may then get the most up-to-date user status and account status for the prospective payer.

At this point, the user 102 may provide user identification 130 or at least verify the user identification for a related user account 190 stored in payment provider server 180 so that funds may be deducted from the user account 184 when conditions for payment of the IOU have been met. Once proper user identification is provided and/or verified, the IOU transaction may be further executed.

In an example embodiment, as discussed above, the payer may initiate the request via a service application (FIG. 1). The service application may be resident on the payee device or at a server maintained by the service provider. The service application may include an IOU application that may be opened on or accessed from the payer device by making a selection through a selection means provided by the application at the device.

In an example embodiment, the payer inputs IOU information, for example the amount, the date on which or by which to pay the amount, the identity of the person to receive the payment and may input a note indicating the purpose for which the IOU is being offered.

The invitation may be sent 226 via a wireless or wired connection to a network. The invitation may be routed to a central payment system server 180 and to a pre-selected payee's payment system account. The pre-selected payees address may be entered by the payer prior to sending the invitation. In an alternate embodiment, the invitation may be sent 226 directly to the payer via the network and the payer device, before being sent to the payment system server 180.

The payment system server may receive the invitation 262 and record the invitation and log the event in an account register for the prospective payer and the prospective payee. The payment server may also forward the invitation 266 to the prospective payee. If the invitation was sent directly to the payee, the payment provider server 180 may receive the invitation 262 from the payee device, after the invitation has been received and acted on by the payee.

In an example embodiment, the payee may receive notification of the invitation 242, for example by a visual indication of the invitation and any related information, including identity of the prospective payer, identification of the reason for the promise to pay, the amount promised to be paid, and a date by which the promise is to be paid. Prior to forwarding the invitation 266, the payment provider server 180 may have attached payer account information 264, for example including verification of the payer's good-standing with the payment system, a rating of the trustworthiness of the payer, verification of the existence of a primary and/or secondary payment sources to cover the promise in the event that the payer's payment system account does not have sufficient funds in it at the date and time of the promise to pay.

Throughout this specification, the terms payer and payee are used to refer to the person promising to pay and the person intended to receive payment, respectively, before the payment is actually made and after the transaction is made. It is understood that the "payer" and "payee" might alternatively be referred to as promisor, promisee, prospective payer and prospective payee, intended payer and intended payee at a time prior to actually transferring the funds to cover the promised, intended payment, and that those persons might alternatively be referred to as payer and payee only after the payment has been executed. Nevertheless, for simplicity, the parties are referred to throughout simply as payer and payee, although alternative terms may be used in certain places for clarity or as appropriate to the circumstance. The term "user" may be used to refer collectively to payers and/or payees. With respect to this specification, users may be any entity, including individual persons, small businesses or larger businesses. Transactions may be between any combination of users, for example two private persons, a private person to a small business or any other user with any user. The only requirement is that a user wishes to propose an IOU and that the other user agrees to receive payment at a future date.

In an example embodiment, the payee may access the IOU application 246 and access the invitation 248. In various example embodiments, the payee may access the invitation prior to or after accessing the IOU application, depending on the particular implementation and how the notification of the invitation was sent 226, forwarded 266 and/or received 242. For example, if the notification was received as an e-mail, a link in the e-mail may permit the payee to open, access or launch a payment service application, including at least the IOU application. In this case, the invitation may be accessed prior to accessing the application. If the user first launches, accesses or runs the payment service application, the service application may provide an indication of the receipt of an invitation as part of the service application and/or IOU application, in which case the user may have accessed the application 246 prior to accessing the invitation 248.

In an example embodiment, the service application or IOU application may provide a means for the payee to respond 250 in the affirmative or the negative to the invitation. For example, a payee may be prompted to select a "YES" or "NO" link, to enter the words YES or NO or select a button or otherwise provide an indication of accepting or declining the invitation. In deciding whether to accept or decline the invitation, the payee may evaluate the invitation information and the payer's account information contained within the invitation or made accessible to the payee by the payment provider server in association with the invitation.

In an example embodiment, the payment provider server may receive the response 268 from the payee, schedule payment 270 in accordance with the IOU transaction and execute payment 272 when the conditions for payment are met. In an example embodiment, where an invitation is sent directly to a payee, the payment provider server may receive the response 268 at the same time that it receives the invitation. In other words, the payer and payee may agree to the IOU transaction before the payment service provider server has bee notified.

In an example embodiment, scheduling payment 270 may include scheduling a date on which to transfer funds from a payer's payment service account to the payee's payment service account. Scheduling payment 270 may also include scheduling payment or partial payment when funds or sufficient funds to cover the IOU are transferred to the payer's payment service account, if the funds are available before the pay-by date.

In an example embodiment, scheduling payment 270 may include scheduling a secondary payment with a secondary pay-by date (earlier than the pay-by date) and a secondary payment amount (less than the primary payment amount). The payer and/or the payee may be provided with an option to propose a secondary payment. The secondary payment may be agreed to simultaneously with responding to an invitation to accept an IOU. In an alternate embodiment, the secondary payment may be proposed and negotiated some time after scheduling the primary payment. The prompt to propose a secondary payment may be provided by running, accessing or downloading the IOU application on a payer or payee device. Scheduling a secondary payment may provide an incentive for a payer to make an earlier payment and/or may provide an incentive for a payee to accept less than the full amount due. Providing a means for proposing, accepting and scheduling a secondary payment may provide a means for the parties (payer and payee) to complete a transaction mutually beneficial to both parties, if agreed upon.

In an example embodiment, executing payment 272 of the IOU may include transferring funds from the payer's payment service account or from a secondary funds source, if the payer's payment service account still does not have sufficient funds on the pay-by date.

In an example embodiment, the payer may receive notice of acceptance 228 from either the payment provider server or the payee device. A notice may also be received when the payment has been scheduled and/or when the payment has been executed.

Figure 3:
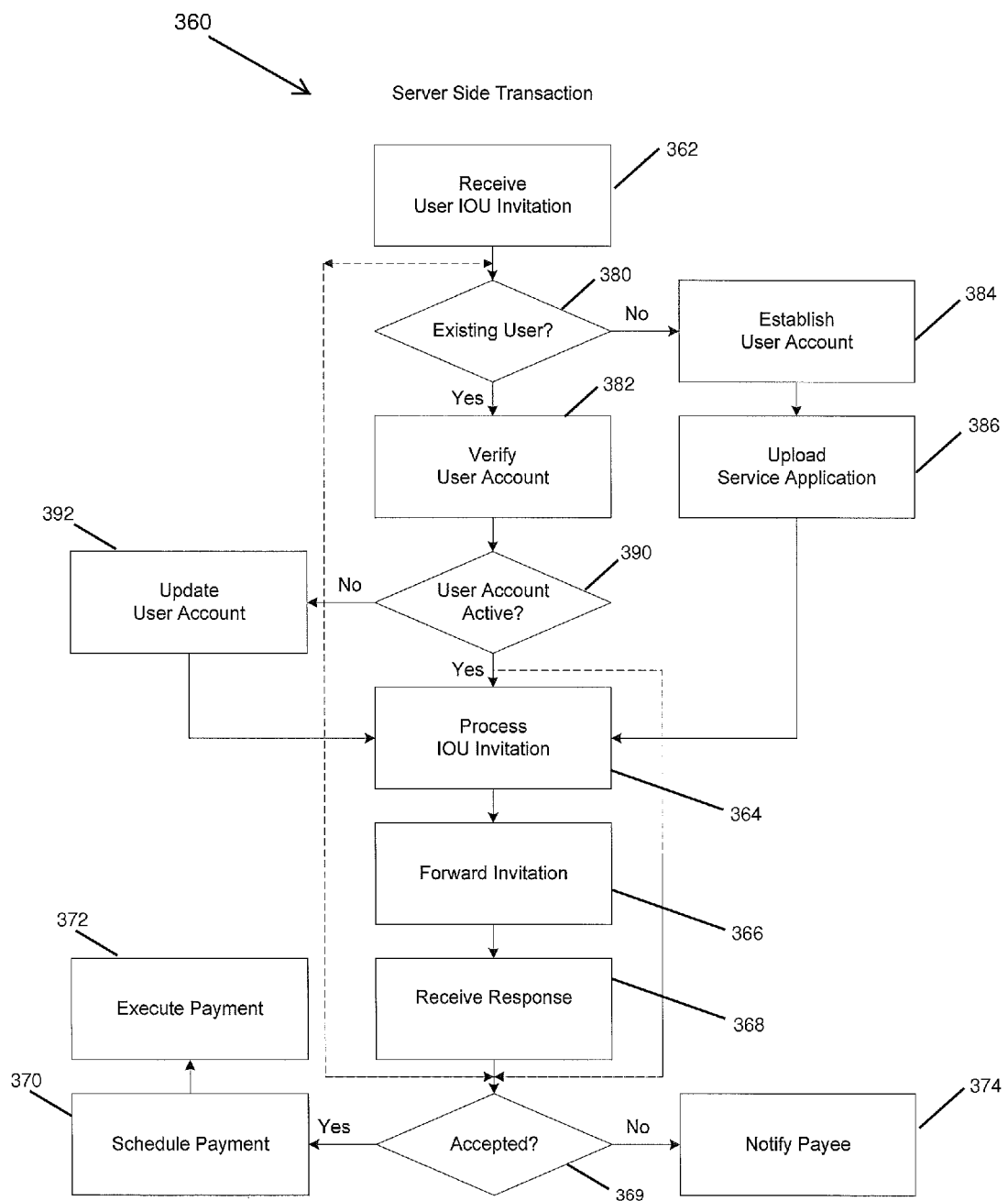
FIG. 3 illustrates an exemplary embodiment of a method for facilitating an online promise-to-pay transaction (IOU) in reference to a payment provider server.

FIG. 3 shows one embodiment of a method 360 for facilitating an online IOU transaction with reference to the payment provider server 180 (FIG. 1).

In an example implementation, the payment provider server 180 receives a purchase request 362 from a user 102 via a payer device 120 (FIG. 1). As previously discussed in reference to FIG. 2, to initiate a user purchase request, the user 102 accesses an IOU application on the payer device to generate the purchase request. In an example embodiment, an invitation to accept an IOU may includes payee information, payer information, and IOU information (e.g. amount, date to pay, pre-payment election) which are passed to the payment provider server 180, in a manner as further discussed herein.

Upon receiving the IOU request 362, the payment provider server 180 determines whether the payer is an existing user 380 having an established user account by, for example, checking a user account list in a user account database. If the payer does not have an established user account, then the payment provider server 180 prompts the payer to establish a user account 384 by providing user information, and the payment provider server 180 uploads the IOU application 386 to the payer device so that the payer may install and run the IOU application on the payer device. In an example embodiment, uploading the service application may include uploading a program to be installed onto the payer device. In another embodiment, uploading the service application may include providing access to a service application resident on the payment server and uploading information, commands or other data required to run or access the application from the payer device.

Otherwise, if the payer is determined to be an existing user by the payment provider server 380, then the payment provider server 180 verifies the user account and user identification information provider by payer in the IOU invitation 382. For example, as previously discussed, the payer may be prompted to provide user identification to complete an online or electronic IOU transaction. Next, the payment provider server 180 may determine if the user account is current and active 390. In some instances, a user's account information may need to be updated, and thus, the payment provider server may prompt the payer to update user account information in the user account for the payer 392. If the user account is current and active, then the payment provider server 180 processes the IOU invitation 364 as discussed below. It should be appreciated by those skilled in the art that the payment provider server 180 may cancel the online purchase transaction at any point in the process if it is determined that the payer entered wrong information or otherwise may not permitted access to the service application or IOU application.

Once the service application is uploaded 386, installed, run and/or accessed on or from the payer device and/or the user account is verified 382 or updated 392, the payment provider server 180 may process the IOU request 364, including, for example, verifying the payer's status, for example the availability of funds and/or secondary funding sources and/or trustworthiness or other rating of the user, and providing information related to the status to be transmitted to a payee for use in evaluating whether to accept an invitation to accept an IOU.

Processing the IOU invitation 364 may also include provisionally scheduling payment in accordance with the request as sent by a payer.

Processing the IOU invitation 364 may also include prompting the payer via, for example, a pop-up window, to verify the IOU invitation. For example, the payment provider server may ask the payer to complete the purchase transaction by selecting a designated box to complete the IOU invitation portion of the transaction. In this way, the payment provider server is adapted to allow the user to cancel the online payment transaction prior to completion.

In an example embodiment, the server side transaction process 360 may include forwarding the invitation 366 to a user/payee. In an example embodiment, the invitation may be forwarded 366 to the payee by the payment provider server. In another example embodiment, the invitation may be forwarded 366 by the payer device. The payment provider server may process the IOU invitation prior to it being forwarded either by the payment provider server or by the payer device. In either case, the invitation, when forwarded to the payee, may already have status, funds availability, secondary source status and/or payer reliability information attached.

In an example embodiment, the payment provider server may receive a response 368 to the invitation from a user/payee via a payee device and the network. In an example embodiment, the payment provider server may determine whether the payer is an existing user 380, verify the user account 382, establish a user account 384, upload a service application 386, including at least the IOU application, determine whether the user account is active 390 and update a user account 392, similarly as performed for the payer/user and discussed above with respect to the payer/user.

Next, the payment provider server evaluates whether the invitation was accepted or declined 369. If it was accepted, the payment provider server may complete the IOU transaction by scheduling a payment 370 for payment on or by a scheduled date and executing the payment 372 by transferring funds from a user/payer account to a user/payee account in accordance with the transaction. In an example embodiment, if there are insufficient funds in a user's payment service account, the payment provider server may execute the payment by causing funds to be transferred from one of a payer/user's secondary funding sources to the payee/user's payment service account in accordance with the transaction.

As discussed above, an IOU transaction may specify a date on which the payment is to be made. In other example embodiments, payment may be scheduled for no later than a certain date, or earlier if or when sufficient funds to cover the payment, or cover partial payment, may be placed in a payer's payment service account. If the funds paid prior to the scheduled payment date have not been fully satisfied by funds from a payer's payment service account, the payment, or remainder of payment, may be made by the payment provider server on the scheduled date. In an example embodiment, executing payment 372 may include any or all of the various scheduling/payment options.

Figure 4:
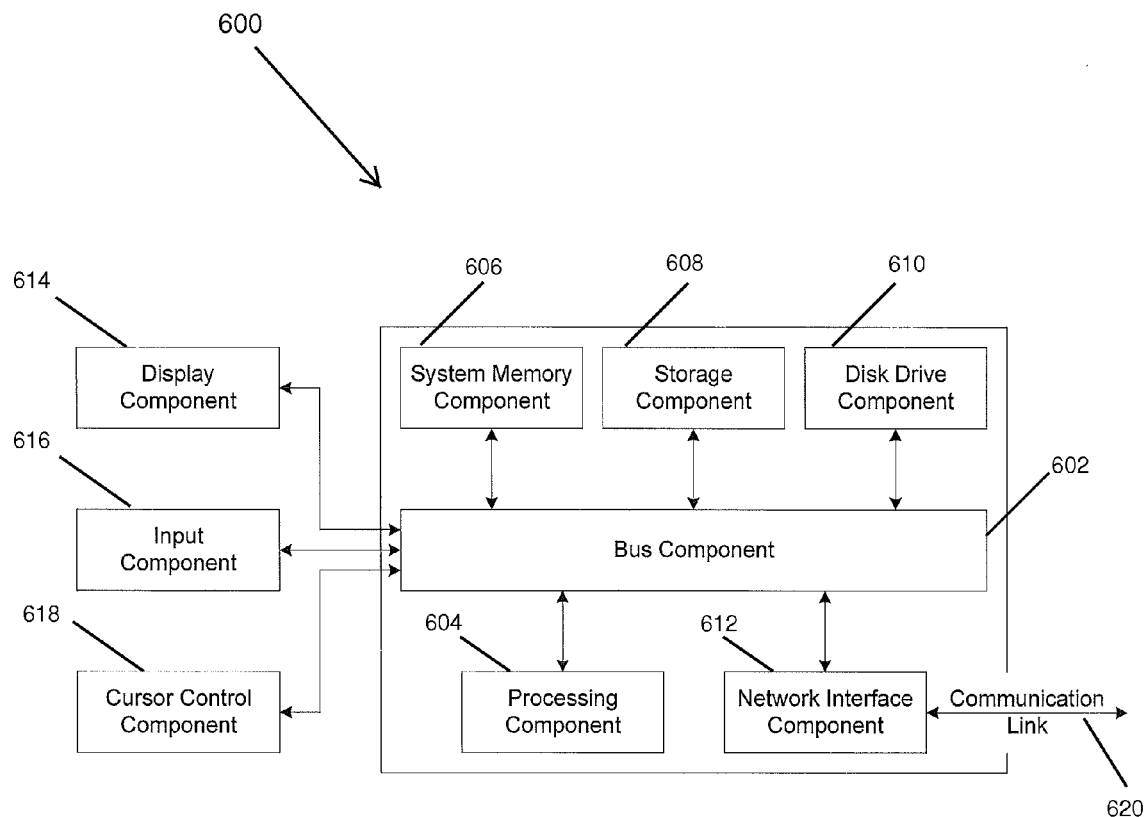
FIG. 4 is a block diagram of an exemplary embodiment of a computer system.

FIG. 4 is a block diagram of an exemplary embodiment of a computer system 600. A computer system 600 may be suitable for implementing example embodiments of various aspects of this disclosure, including, for example, the payer device 120, the payee device 140, and the payment processing device 180. In various implementations of various embodiments, the payer device 120 and/or payee device 140 may comprise a personal computing device, such as a personal computer, laptop, PDA, cellular phone or other personal computing or communications devices. The payment processing server 180 may comprise a network computing device, such as a server. The payment processing server 180 may comprise more than one server, computer or processor combined to provide the payment services provided by a payment processing service. Thus, it should be appreciated that the devices 120, 140, 180 may be implemented as computer system 600 in a manner as follows.

In an example embodiment, computer system 600 may include a bus 602 or other communication mechanism for communicating information, which interconnects subsystems and components, such as processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., CRT or LCD), input component 616 (e.g., keyboard or keypad), and/or cursor control component 618 (e.g., mouse or trackball). In an example embodiment, disk drive component 610 may comprise a database having one or more disk drive components.

In an example embodiment, computer system 600 may perform specific operations by processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of or in combination with software instructions to implement the invention.

Logic may be encoded in a computer readable medium, which may refer to any medium that participates in providing instructions to processor 604 for execution. Such a medium may take many forms, including but not limited to, non-volatile media, volatile media, and transmission media. In various implementations, non-volatile media includes optical or magnetic disks, such as disk drive component 610, volatile media includes dynamic memory, such as system memory component 606, and transmission media includes coaxial cables, copper wire, and fiber optics, including wires that comprise bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various example embodiments, execution of instruction sequences for practicing the invention may be performed by computer system 600. In various other embodiments, a plurality of computer systems 600 coupled by communication link 620 (e.g., network 160 of FIG. 1, LAN, WLAN, PTSN, or various other wired or wireless networks) may perform instruction sequences to practice the invention in coordination with one another.

Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. Thus, the invention is limited only by the claims.

What is claimed is:

1. A method of making a financial transaction, comprising:
  receiving a promise-to-pay (IOU) invitation from a first user device, wherein the first user device is associated with a payer;
  receiving a response to the promise-to-pay invitation from a second user device, wherein the second user device is associated with a payee;
  scheduling a payment responsive to the invitation and the response by a payment provider processor if the response from the payee is an acceptance of the invitation, wherein the payment is made from an account associated with the first user device to a second user account associated with the second user device;
  transmitting information about the payer to the payee prior to receiving the response to aid the payee in determining whether to accept or decline the invitation; and
  executing the payment by the payment provider processor when conditions for payment have been met wherein scheduling the payment comprises scheduling a primary payment amount to be made on the pay-by date and scheduling a secondary payment amount to be made on a secondary pay-by date, wherein the secondary payment amount is less than the primary amount but completely satisfies the IOU and the secondary pay-by date is before the primary pay-by date and wherein the secondary pay-by-date and the secondary payment amount is proposed by the payee and/or the payer prior to completing the financial transaction between the payer and the payee and wherein executing the payment comprises transferring funds from a first payment services funds account associated with the first user device when a sufficient balance is available at any time before or up to the pay-by date or transferring funds from a secondary, third-party funding source associated with the first user device on the pay-by date if the first payment services account has an insufficient balance up to and including the pay-by date.

2. The method of claim 1, further comprising generating the invitation by installing, accessing or running a promise-to-pay application on the first user device and sending the invitation to the second user device.

3. The method of claim 1, wherein executing the payment comprises transferring funds from a first payment services funds account associated with the first user device if a sufficient balance is available or transferring funds from a secondary, third-party funding source associated with the first user device if the payment services funds account has an insufficient balance.

4. The method of claim 2, wherein generating the promise-to-pay transaction comprises a remote call from a program using a communications protocol comprising an application program interface (API), a web services definitional language (WSDL), or simple object access protocol (SOAP).

5. A computer-readable medium containing instructions that cause a service provider facilitating financial transactions over a network to perform a method comprising:
   receiving a promise-to-pay (IOU) invitation from a first user device, wherein the first user device is associated with a payer;
   receiving a response to the promise-to-pay invitation from a second user device, wherein the second user device is associated with a payee;
   scheduling a payment responsive to the invitation and the response by a payment provider processor if the response from the payee is an acceptance of the invitation, wherein the payment is made from an account associated with the first user device to a second user account associated with the second user device;
   transmitting information about the payer to the payee prior to receiving the response to aid the payee in determining whether to accept or decline the invitation; and
   executing the payment by the payment provider processor when conditions for payment have been met wherein scheduling the payment comprises scheduling a primary payment amount to be made on the pay-by date and scheduling a secondary payment amount to be made on a secondary pay-by date, wherein the secondary payment amount is less than the primary amount but completely satisfies the IOU and the secondary pay-by date is before the primary pay-by date and wherein the secondary pay-by-date and the secondary payment amount is proposed by the payee and/or the payer prior to completing a financial transaction between the payer and the payee and wherein executing the payment comprises transferring funds from a first payment services funds account associated with the first user device when a sufficient balance is available at any time before or up to the pay-by date or transferring funds from a secondary, third-party funding source associated with the first user device on the pay-by date if the first payment services account has an insufficient balance up to and including the pay-by date.

6. A system for facilitating financial transactions over a network, the system comprising:
   a first user device adapted to allow a first user to send an invitation to a second user, via the network, to accept a promise to pay (IOU), wherein the first user is a payer and the second user is a payee;
   a second user device adapted to allow the second user to generate a response to the invitation via the network;
   a payment processing device adapted to receive the invitation and the response, to schedule a payment if the response from the payee is an acceptance of the invitation, to transmit information about the payer to the payee prior to receiving the response to aid the payee in determining whether to accept or decline the invitation, and to initiate the payment when conditions for executing the payment have been met, wherein the IOU comprises a promise to pay a primary amount by a primary pay-by date and a secondary amount less than the primary amount and a secondary pay-by date, wherein the IOU is completely satisfied by paying the secondary amount by the secondary pay-by date or by paying the primary amount by the primary pay-by date and wherein the secondary pay-by-date and the secondary payment amount is proposed by the payee and/or the payer prior to completing a financial transaction between the payer and the payee and wherein executing the payment comprises transferring funds from a first payment services funds account associated with the first user device when a sufficient balance is available at any time before or up to the pay-by date or transferring funds from a secondary, third-party funding source associated with the first user device on the pay-by date if the first payment services account has an insufficient balance UP to and including the pay-by date.

7. The system according to claim 6, wherein each user device comprises a computer, computing device, wireless telephone, cellular telephone, personal digital assistant or notebook computer.

8. The system according to claim 6, wherein the payment processing device comprises a computing device with memory having machine readable instructions stored in memory, including a service application with an IOU application, and user funds records stored in the memory and associated with the first and second users, and user account information stored in the memory and associated with the first and second users.

9. The system according to claim 8, wherein the user account information includes records of a third-party funding source associated with the first and second users.

10. The system according to claim 9, wherein the third-party funding source comprises one of a bank or a credit card.

11. The system according to claim 8, wherein the user account information includes user status information.

12. The system according to claim 11, wherein the user status information comprises a reliability rating or information related to the availability of funds.

* * * * *

UNITED STATES PATENT AND TRADEMARK OFFICE
CERTIFICATE OF CORRECTION

| | | |
|---|---|---|
| PATENT NO. | : 8,001,025 B2 | Page 1 of 1 |
| APPLICATION NO. | : 12/147820 | |
| DATED | : August 16, 2011 | |
| INVENTOR(S) | : Srinivas Vadhri | |

It is certified that error appears in the above-identified patent and that said Letters Patent is hereby corrected as shown below:

In Claim 6, column 14, line 40, please delete "UP" and replace it with "up."

Signed and Sealed this
Tenth Day of April, 2012

David J. Kappos
*Director of the United States Patent and Trademark Office*